United States Patent [19]

Walsh

[11] Patent Number: 5,782,600

[45] Date of Patent: Jul. 21, 1998

[54] SYSTEM AND METHOD FOR MOVING SHELF UNITS

[76] Inventor: Michael D. Walsh, 3086 Kress La., Potosi, Wis. 53820

[21] Appl. No.: 771,489

[22] Filed: Dec. 23, 1996

[51] Int. Cl.[6] ............................. B62B 1/00; B62B 3/00
[52] U.S. Cl. .................... 414/490; 414/444; 414/446; 414/458; 254/15; 280/47.131
[58] Field of Search ........................... 414/444, 490, 414/446, 458, 12; 280/63, 47.11, 47.12, 47.131, 47.15, 47.24; 254/15, 131

[56] References Cited

U.S. PATENT DOCUMENTS

| | | | |
|---|---|---|---|
| 2,296,610 | 9/1942 | Grassick | 414/444 |
| 2,521,819 | 9/1950 | Baer | 414/458 |
| 3,145,863 | 8/1964 | Dunaski | 414/458 |
| 3,370,725 | 2/1968 | Jones | 414/458 |
| 3,633,774 | 1/1972 | Lee | 414/786 |
| 3,786,947 | 1/1974 | Craft, III . | |
| 3,809,261 | 5/1974 | Lee | 414/373 |
| 3,923,354 | 12/1975 | Young | 312/201 |
| 4,084,125 | 4/1978 | King | 312/199 |
| 4,138,173 | 2/1979 | Taniwaki | 312/198 |
| 4,624,468 | 11/1986 | Onken | 414/446 |
| 4,824,313 | 4/1989 | Miller | 414/444 |
| 4,921,264 | 5/1990 | Duffy | 414/458 |
| 4,934,893 | 6/1990 | Johnson | 414/458 |
| 5,018,930 | 5/1991 | Hardin et al. | 414/458 |

FOREIGN PATENT DOCUMENTS 457741   9/1913   France ................ 280/47.24

Primary Examiner—James W. Keenan
Assistant Examiner—Thuy V. Tran
Attorney, Agent, or Firm—Arnold, White & Durkee

[57] ABSTRACT

A cost-effective system and method for quickly and easily moving a fully loaded shelf unit is provided. The shelf unit includes first and second opposing vertical feet supporting the shelf unit on a ground surface. The system and method employ a first prying arm, a second prying arm, and a rolling device. The first and second prying arms each include a pushable member and a lifting member joined to each other. The rolling device includes first and second end supports and an intermediate cross bar extending between the end supports. The rolling device includes a pair of casters mounted to an underside of the cross bar for allowing the rolling device to be rolled along the ground surface. The end supports are located closer than the cross bar to the ground surface when the rolling device is positioned with its casters contacting the ground surface. To move the shelf unit, the prying arms are used to lift the respective vertical feet at least partially off the ground surface. Next, the rolling device is rolled beneath the shelf unit to position the end supports beneath the respective vertical feet. The prying arms are then used to lower the vertical feet onto the respective end supports. With the vertical feet of the shelf unit supported by the respective end supports, the shelf unit is moved to a desired location by rolling the rolling device.

24 Claims, 9 Drawing Sheets

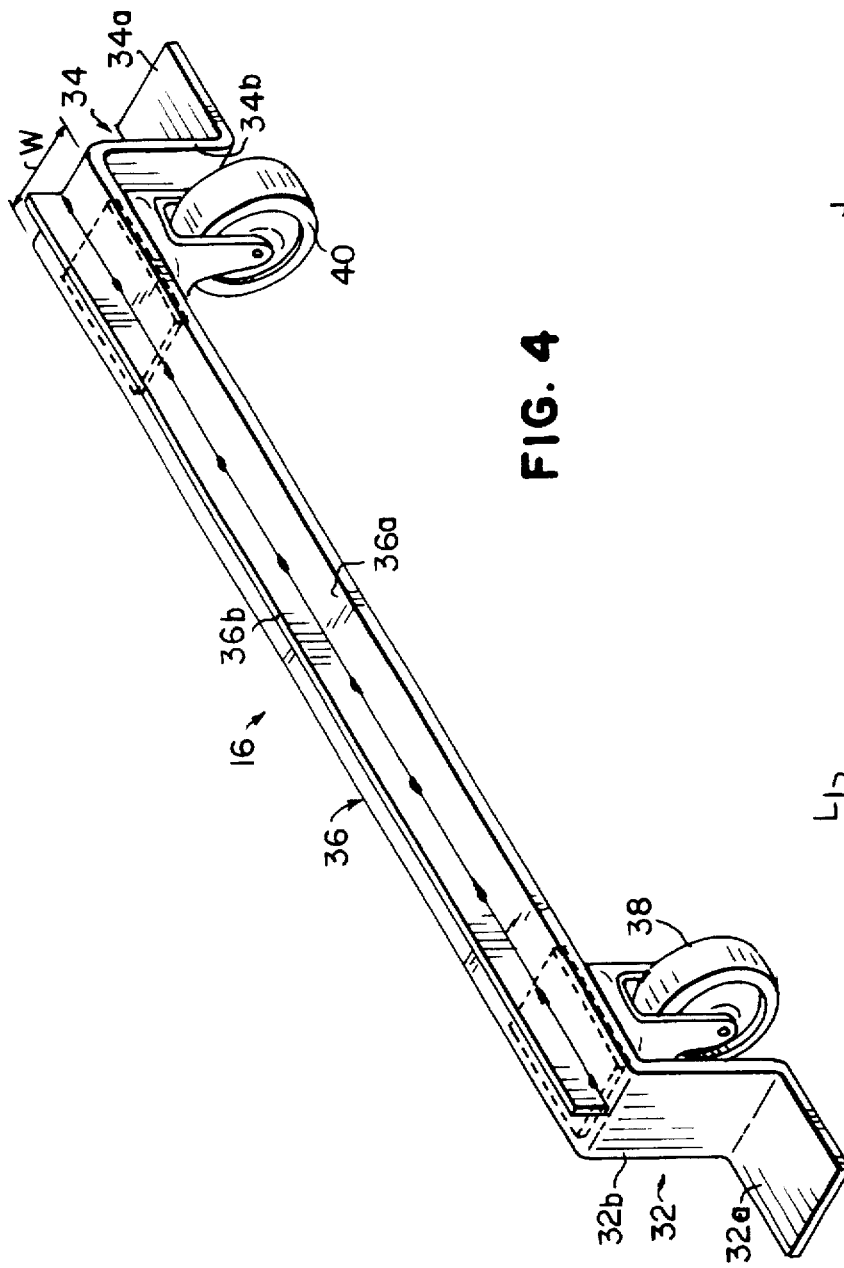
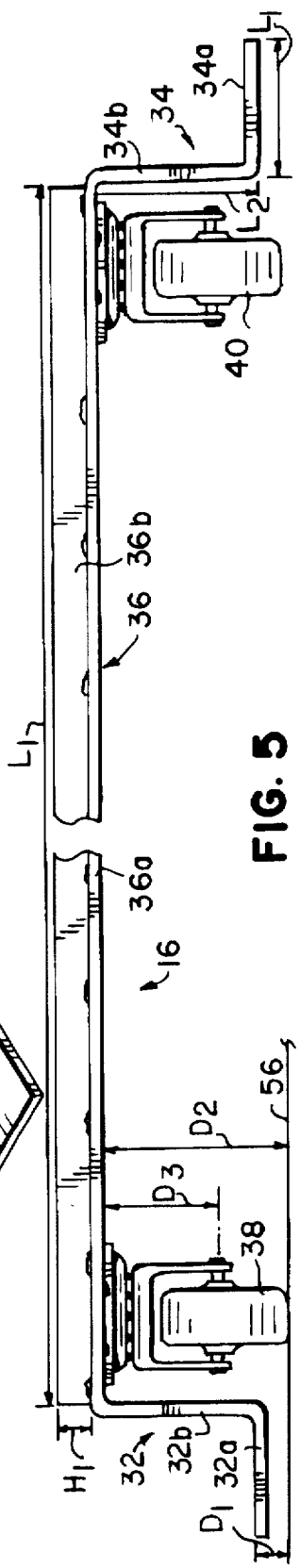
FIG. 4
FIG. 5

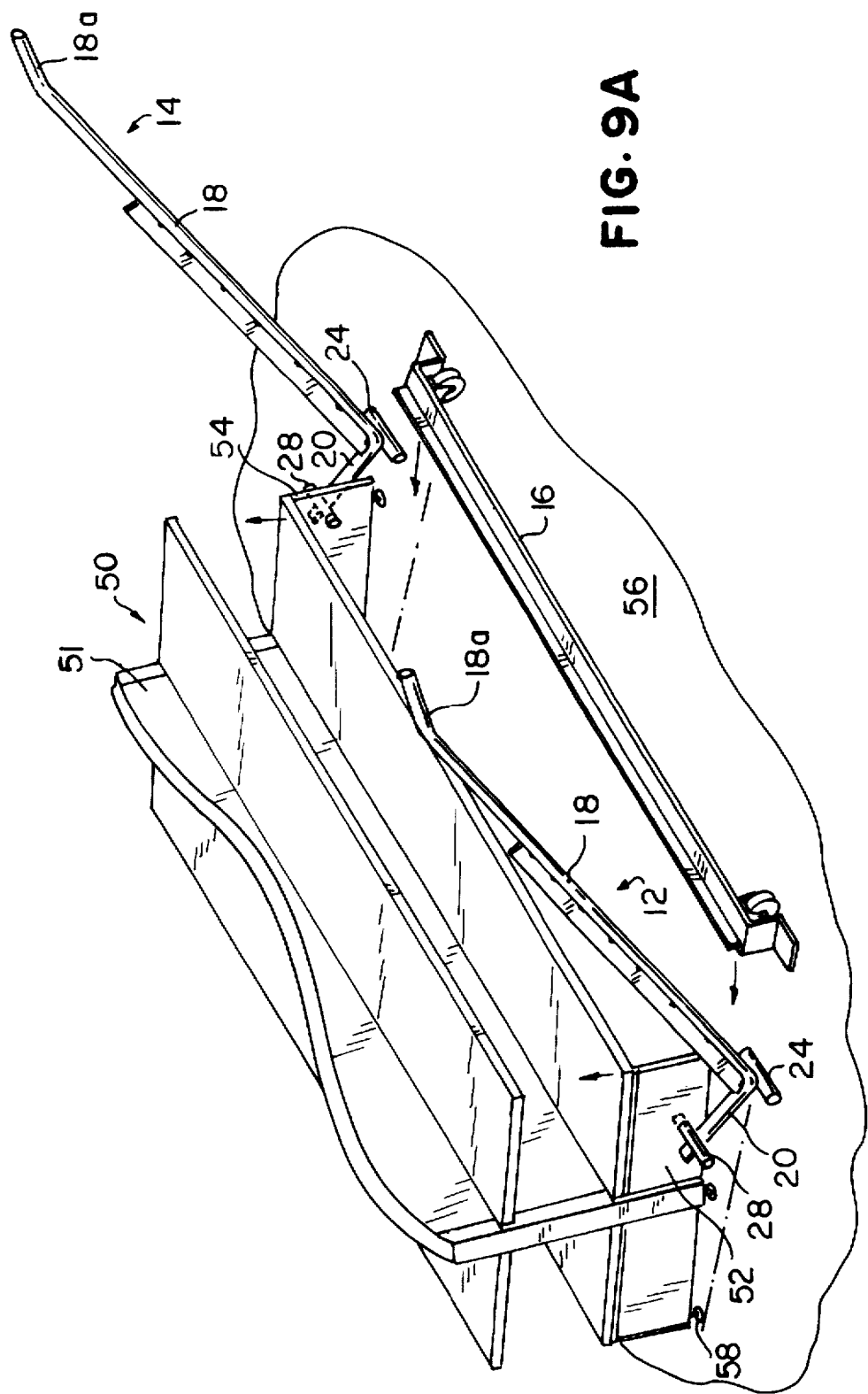

# 5,782,600

SYSTEM AND METHOD FOR MOVING SHELF UNITS

FIELD OF THE INVENTION

The present invention relates generally to systems and methods for moving shelf units and, more particularly, relates to a cost-effective system and method for quickly and easily moving a shelf unit which allows the shelf unit to be moved while fully loaded with goods.

BACKGROUND OF THE INVENTION

Stores such as hardware stores, department stores, and grocery stores display their goods on a plurality of shelf units. The shelf units are arranged throughout the store in a manner that is aesthetically appealing and allows for easy access to the displayed goods. Occasionally, it is desirable to rearrange the shelf units so that customers do not become too familiar with the arrangement of the shelf units and are stimulated into perusing other goods offered for sale by the store.

Heretofore, two primary techniques have been used to rearrange the shelf units in a store. In one technique, most or all of the goods are first removed from the shelf units, the unloaded shelf units are manually lifted and carried to a different location in the store, and then the goods are reloaded onto the shelf units. The goods must be removed from the shelf units prior to moving them because a fully loaded shelf unit is usually too heavy to lift and carry by hand. A fully loaded shelf unit can weigh several hundred pounds. This technique of rearranging the shelf units is undesirable because it is both time-consuming and labor intensive. It can take several days or weeks to rearrange all the shelf units in a store. Also, individuals moving the shelf units must expend significant energy to first unload the goods from the shelf units, manually lift and carry the unloaded shelf units, and then reload the goods onto the shelf units.

In another technique, the shelf units are rearranged using complicated apparatus of the type proposed in U.S. Pat. No. 4,934,893 to L. Johnson. Although such apparatus allow the shelf units to be moved without first removing the goods, they are expensive and bulky in construction.

A need therefore exists for a system and method for moving shelf units that overcomes the aforementioned shortcomings associated with existing techniques.

SUMMARY OF THE INVENTION

The present invention provides a system and method for moving a shelf unit. The shelf unit includes first and second opposing vertical feet supporting the shelf unit on a ground surface.

The system and method employ a first prying arm, a second prying arm, and a rolling device. The first and second prying arms each include a pushable member and a lifting member joined to each other. The rolling device includes first and second opposing end supports and an intermediate cross bar extending between the first and second end supports. The rolling device includes a pair of casters mounted to an underside of the cross bar for allowing the rolling device to be rolled along the ground surface. The first and second end supports are located closer than the cross bar to the ground surface when the rolling device is positioned with its casters contacting the ground surface.

To move the shelf unit, the first and second prying arms are used to lift the respective first and second vertical feet at least partially off the ground surface. Next, the rolling device is rolled beneath the shelf unit to position the first and second end supports beneath the respective first and second vertical feet. The first and second prying arms are then used to lower the first and second vertical feet onto the respective first and second end supports. With the first and second vertical feet of the shelf unit supported by the respective first and second end supports, the shelf unit is moved to a desired location by rolling the rolling device.

BRIEF DESCRIPTION OF THE DRAWINGS

Other objects and advantages of the invention will become apparent upon reading the following detailed description and upon reference to the drawings in which:

FIG. 4 is an enlarged isometric view of a rolling device of the system in FIG. 1;

FIG. 5 is an enlarged side view of the rolling device in FIG. 4;

FIGS. 9A-B are isometric views showing the method of using the system in FIG. 1 to move a shelf unit;

Figure 1:
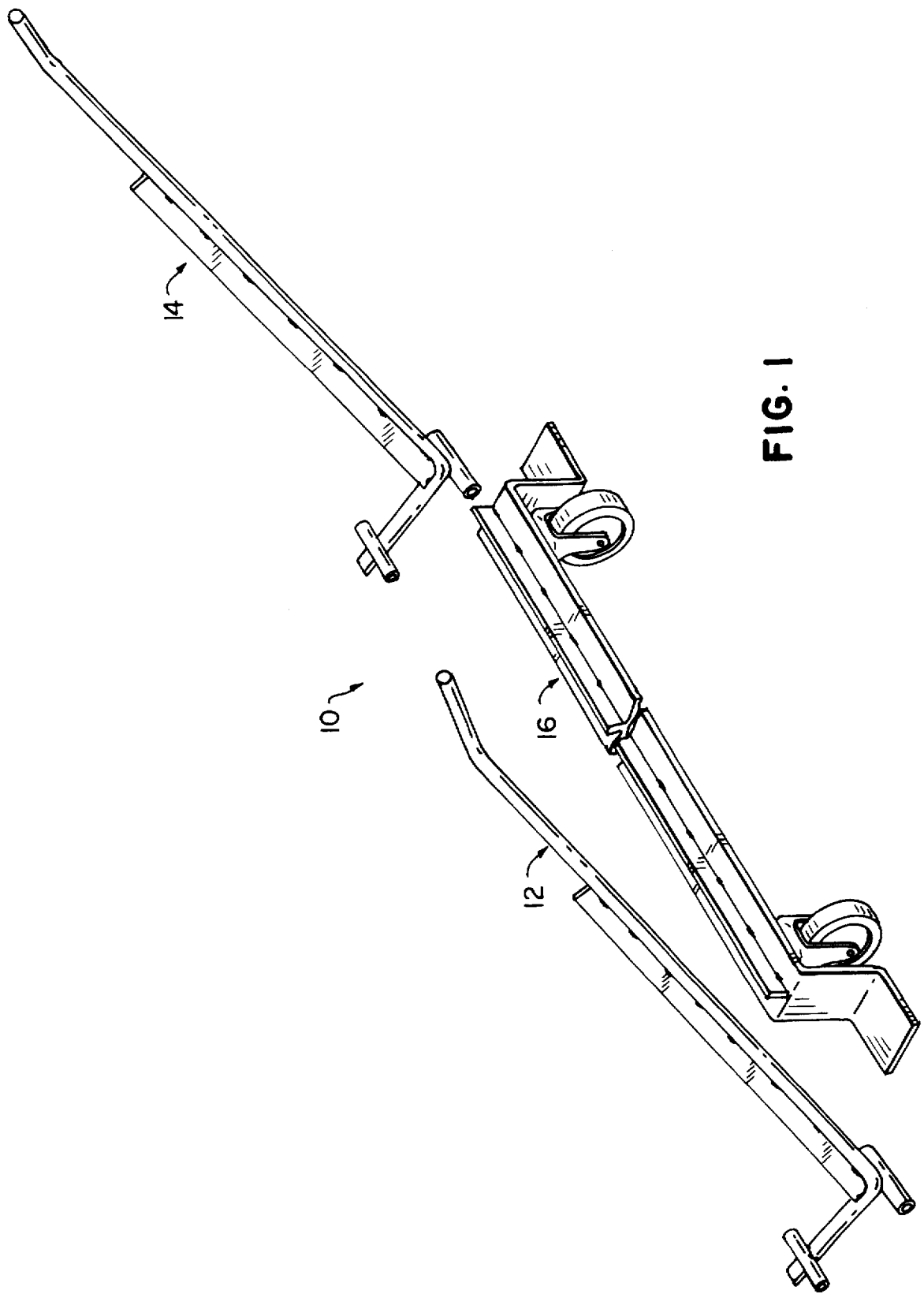
FIG. 1 is an isometric view of a system for moving a shelf unit in accordance with the present invention.

While the invention is susceptible to various modifications and alternative forms, a specific embodiment thereof has been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENT

Turning now to the drawings, FIG. 1 illustrates a system 10 for moving a shelf unit of the type used to accommodate and display goods in a store. The system 10 includes a first prying arm 12, a second prying arm 14, and a rolling device 16. The prying arms 12 and 14 are identical in construction and, therefore, only the prying arm 12 is described in detail below.

Figure 2:
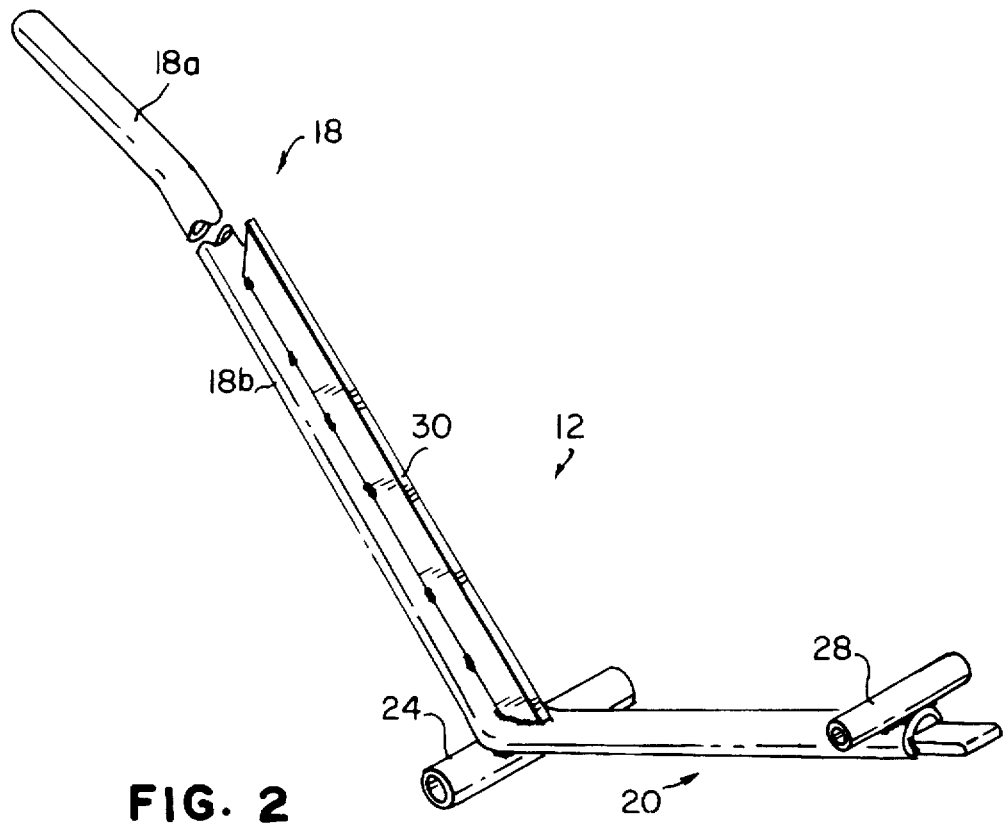
FIG. 2 is an enlarged isometric view of a prying arm of the system in FIG. 1.
Figure 3:
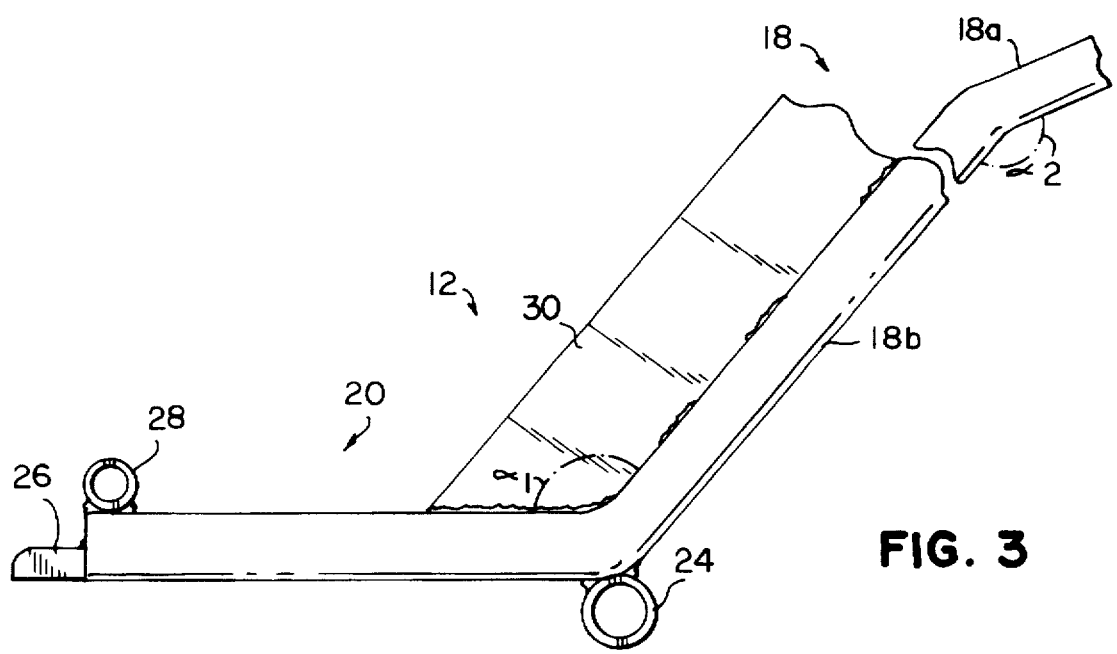
FIG. 3 is an enlarged side view of the prying arm in FIG. 2.

Referring to FIGS. 2 and 3, the prying arm 12 includes a pushable member 18 and a lifting member 20 integrally formed with each other. The pushable member 18 and the lifting member 20 define an inclusive angle $\alpha_1$ (see FIG. 3) ranging between about 120 degrees and 140 degrees. The preferred inclusive angle $\alpha_1$ is approximately 130 degrees. The pushable member 18 preferably includes an angled proximal handle portion 18a to facilitate grasping and handling of the prying arm 12. The handle portion 18a and the remainder 18b of the pushable member 18 define an inclusive angle $\alpha_2$ (see FIG. 3) ranging between about 135 degrees and 155 degrees. The preferred inclusive angle $\alpha_2$ is approximately 145 degrees.

The prying arm 12 includes a transverse pivot element 24 located at a junction of the pushable member 18 and the lifting member 20. When the prying arm 12 is used to lift a shelf unit onto the rolling device 16 (see FIGS. 8A–C and 9A–B), the pivot element 24 contacts the ground surface from which the shelf unit is lifted. As a user grasps the handle portion 18a and pushes downward on the pushable member 18, the lifting member 20 rotates upward about the stable pivot element 24.

Figure 7A:
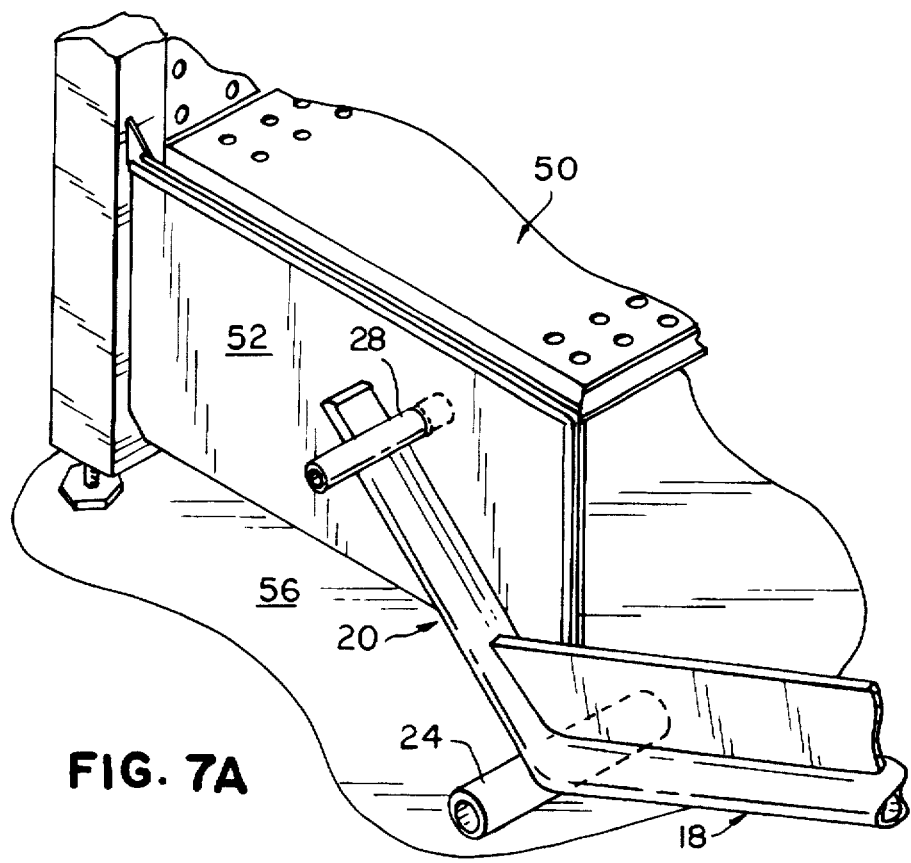
FIG. 7A is an enlarged isometric view showing one method of using the prying arm to engage a vertical foot of a shelf.
Figure 7B:
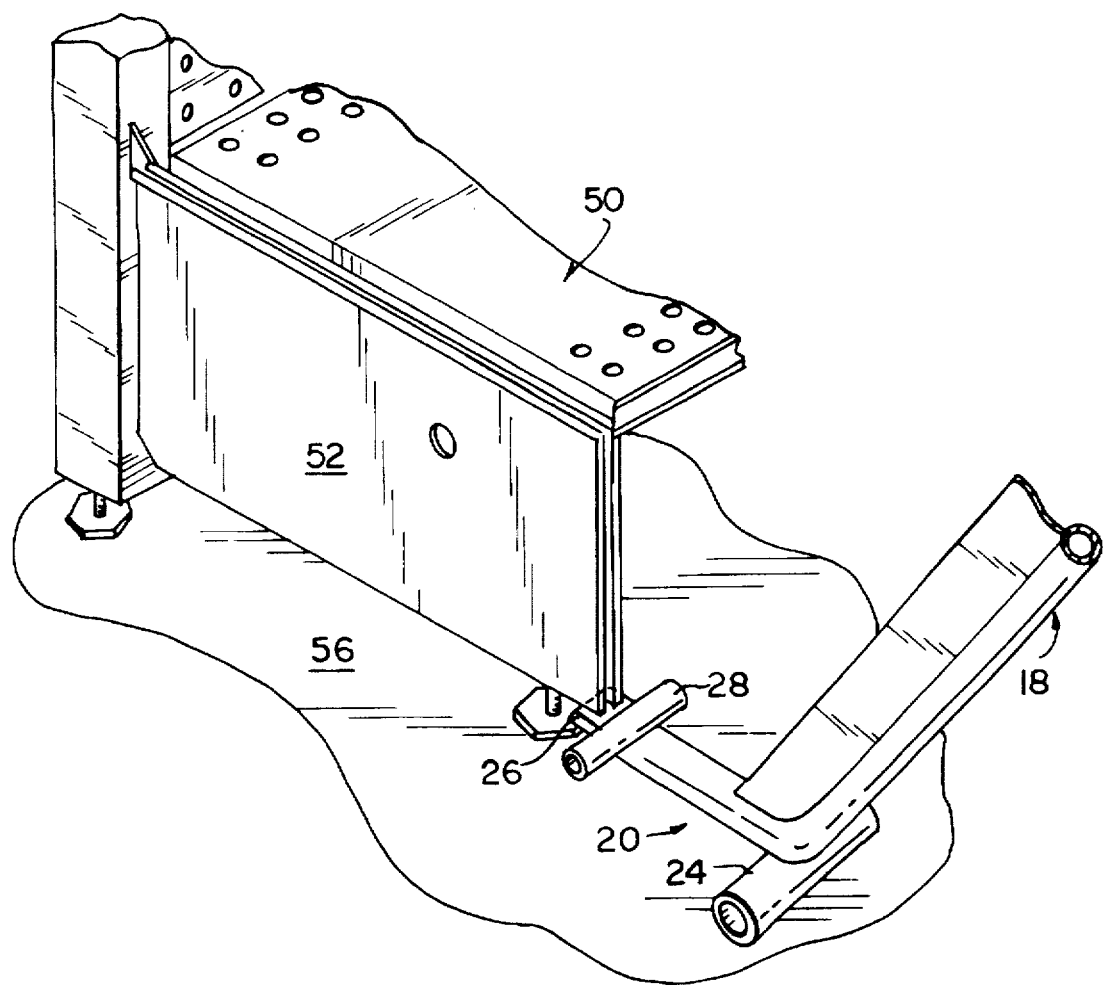
FIG. 7B is an enlarged isometric view showing another method of using the prying arm to engage the vertical foot of the shelf unit.

The lifting member 20 of the prying arm 12 includes alternative means for engaging a corresponding vertical foot of the shelf unit to be lifted onto the rolling device 16. First, the lifting member 20 includes a narrow distal end lip 26 having a thickness substantially smaller than a remainder of the lifting member 20. As best shown in FIG. 7B, the end lip 26 engages the vertical foot 52 of the shelf unit 50 by being placed beneath the vertical foot and contacting the underside of the vertical foot. Second, the lifting member 20 includes a transverse member 28 proximate to the end lip 26. As best shown in FIG. 7A, the transverse member 28 engages the vertical foot 52 by being inserted into a hole formed in the vertical foot. Although the lifting member 20 is provided with both the end lip 26 and the transverse member 28, which one is used depends upon the type of shelf unit to be lifted. On the one hand, if the shelf unit has a hole formed in each vertical foot, the transverse member 28 is inserted into the hole of the corresponding vertical foot and used to lift the shelf unit (FIG. 7A). On the other hand, if the shelf unit does not have a hole formed in each vertical foot, the end lip 26 is placed beneath the corresponding vertical foot and used to lift the shelf unit (FIG. 7B).

The prying arm 12 is preferably composed of a rigid, durable material capable of lifting several hundred pounds without deformation. In the preferred embodiment, the prying arm 12 weighs approximately thirteen pounds. The pushable member 18 and the lifting member 20 are formed from a single steel pipe having an outer diameter measuring approximately 1.25 inches. The angled handle portion 18a of the pushable member 18 has a length of approximately nine inches, and the remainder 18b of the pushable member 18 has a length of approximately 41 inches. The lifting member 20 (excluding the end lip 26) has a length of approximately eight inches, and the end lip 26 has a length of approximately one inch and a thickness of approximately 0.25 inches. The pivot element 24 is formed from a steel pipe having a length of approximately four inches and an outer diameter measuring approximately 1.25 inches. The pivot element 24 is welded to the junction of the pushable member 18 and the lifting member 20. The transverse member 28 is formed from a steel pipe having a length of approximately four inches and an outer diameter measuring approximately 0.75 inches.

To reinforce the prying arm 12, the prying arm 12 preferably includes a steel reinforcement plate 30 welded to both the pushable member 18 and the lifting member 20. The reinforcement plate 30 helps to prevent the prying arm 12 from bending about the junction joining the pushable member 18 and the lifting member 20, thereby maintaining the inclusive angle $\alpha_1$ at approximately 130 degrees. In the preferred embodiment, the plate 30 has a maximum length of approximately 23 inches (see FIG. 2), a width of approximately two inches, and a thickness of approximately 0.25 inches.

Referring to FIGS. 4 and 5, the rolling device 16 includes opposing end supports 32 and 34 and an intermediate cross bar 36 extending between the end supports 32 and 34. The cross bar 36 and the end supports 32 and 34 are integrally formed with each other. Further, the rolling device 16 includes a pair of casters 38 and 40 mounted to an underside of the cross bar 36 for allowing the rolling device 16 to be rolled along a ground surface. To stabilize the rolling device 16, the pair of casters 38 and 40 are horizontally adjacent to the respective end supports 32 and 34.

The end supports 32 and 34 are generally L-shaped and include respective generally horizontal portions 32a and 34a for supporting the respective vertical feet of a shelf unit. Since the vertical feet of the shelf unit must be lifted onto the respective horizontal portions 32a and 34a, it is desirable to minimize the height to which the vertical feet must be lifted. The smaller the height to which the vertical feet must be lifted, the less energy that must be expended during the lifting process. To minimize the height to which the vertical feet of the shelf unit must be lifted, the horizontal portions 32a and 34a of the respective end supports 32 and 34 are located significantly closer than the cross bar 36 to the ground surface when the rolling device 16 is positioned with its casters 38 and 40 contacting the ground surface. Specifically, the horizontal portions 32a and 34a are located no greater than a vertical distance $D_1$ (see FIG. 5) of about two inches from the ground surface 56 and preferably are located approximately one inch from the ground surface.

Figure 6:
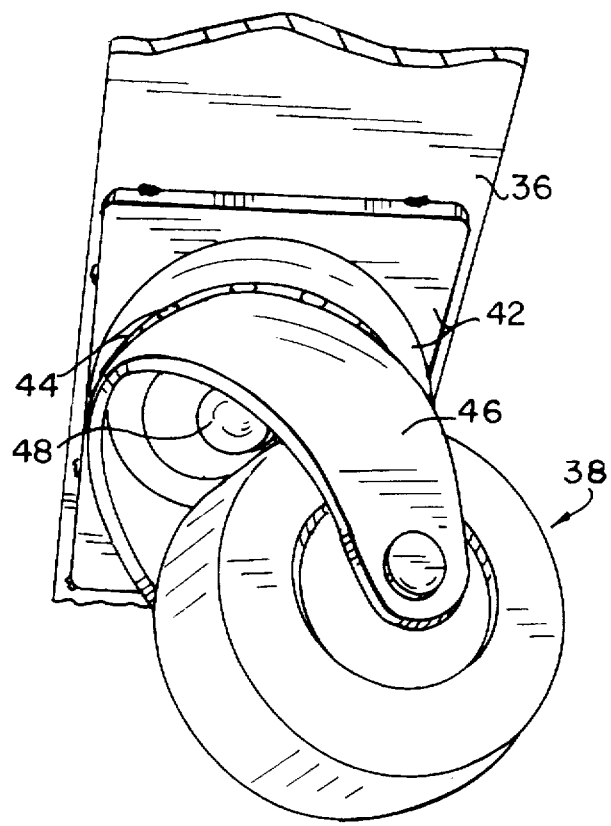
FIG. 6 is an enlarged isometric view of a caster of the rolling device in FIG. 4.

To allow the rolling device 16 to make turns while rolling along the ground surface, the pair of casters 38 and 40 are mounted for swivel movement using the specific mounting elements illustrated in FIG. 6. To mount the caster 38, a steel mounting plate 42 is first welded to the underside of the cross bar 36, and ball bearings 44 are placed in a circular recess formed by the mounting plate 42. The steel frame 46 supporting the caster 38 is then connected to the mounting plate 42 by a steel fastener 48. The ball bearings 44 are captured between the mounting plate 42 and the fastened frame 46. The fastener 48 has an enlarged retaining head that simultaneously retains the frame 46 vertically adjacent to the mounting plate 42 and allows the frame 46 to rotate relative to the stationary mounting plate 42. The elements for mounting the caster 40 are identical to those described above in connection with the caster 38.

Referring back to FIGS. 4 and 5, the rolling device 16 is preferably composed of a rigid, durable material capable of lifting several hundred pounds without deformation. In the preferred embodiment, the rolling device 16 weighs approximately 26 pounds and can support a load in excess of 500 pounds and most preferably in excess of 700 pounds. Except for the casters 38 and 40, the rolling device 16 is composed of steel. The cross bar 36 includes a base portion 36a and a reinforcing brace 36b welded to an upper surface of the base portion 36a. The base portion 36a and the end supports 32 and 34 are formed from a single piece of steel having a width W (see FIG. 4) of approximately four inches and a thickness of approximately 0.25 inches. The base portion 36a has a length $L_1$ (see FIG. 5) of approximately 45.5 inches, the vertical portions 32b and 34b of the respective end supports 32 and 34 each have a length $L_2$ (see FIG. 5) of approximately four inches, and the horizontal portions 32a and 34a of the respective end supports 32 and 34 each have a length $L_3$ (see FIG. 5) of approximately three inches.

The brace 36b of the cross bar 36 has a height $H_1$ (see FIG. 5) of approximately one inch, a thickness of approximately 0.25 inches, and a length $L_1$ (see FIG. 5) of approximately 45.5 inches.

The casters 38 and 40 are each composed of hard rubber. The vertical distance $D_2$ (see FIG. 5) between the lower surface of the cross bar 36 and the ground surface on which the rolling device rests is approximately five inches. Since the casters 38 and 40 each have a diameter of approximately four inches, the vertical distance $D_3$ between the lower surface of the cross bar 36 and the centers of the casters 38 and 40 is approximately three inches. The horizontal distance between the centers of the casters 38 and 40 and the respective vertical portions 32b and 34b is approximately 3.5 inches.

Figure 8A:
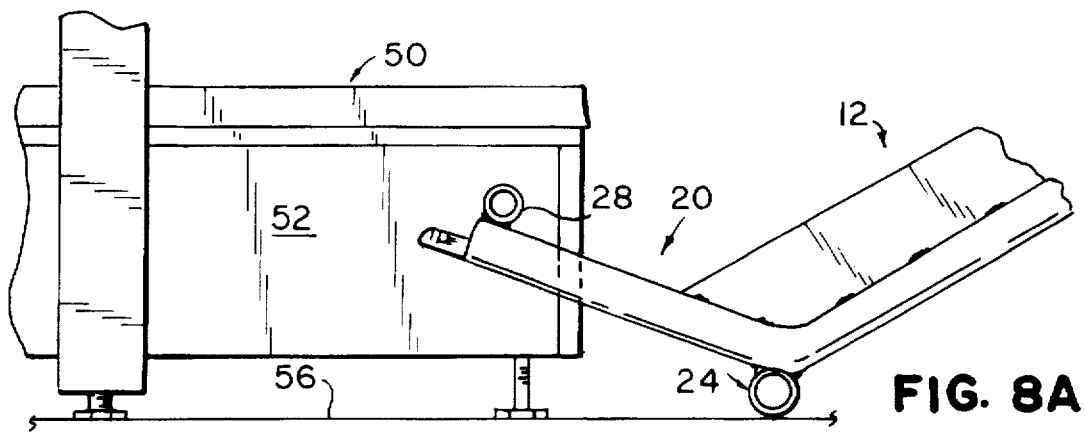
FIGS. 8A-C are side views showing a method of using the system in FIG. 1 to move a shelf unit.
Figure 8B:
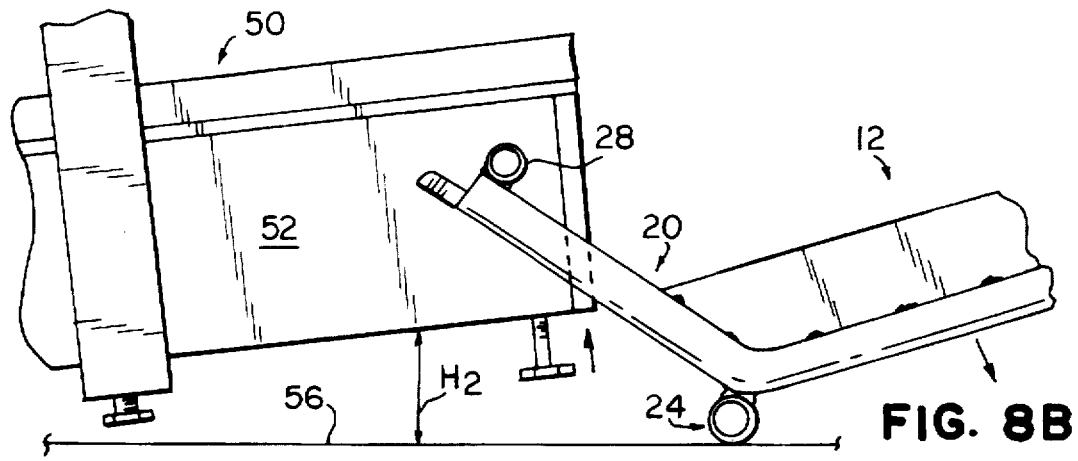
Figure 8C:
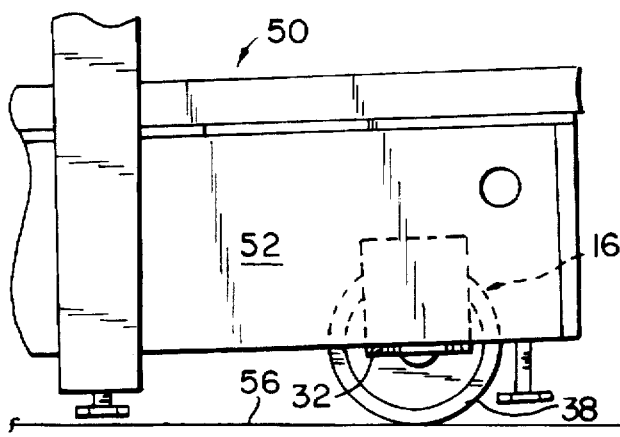
Figure 9B:
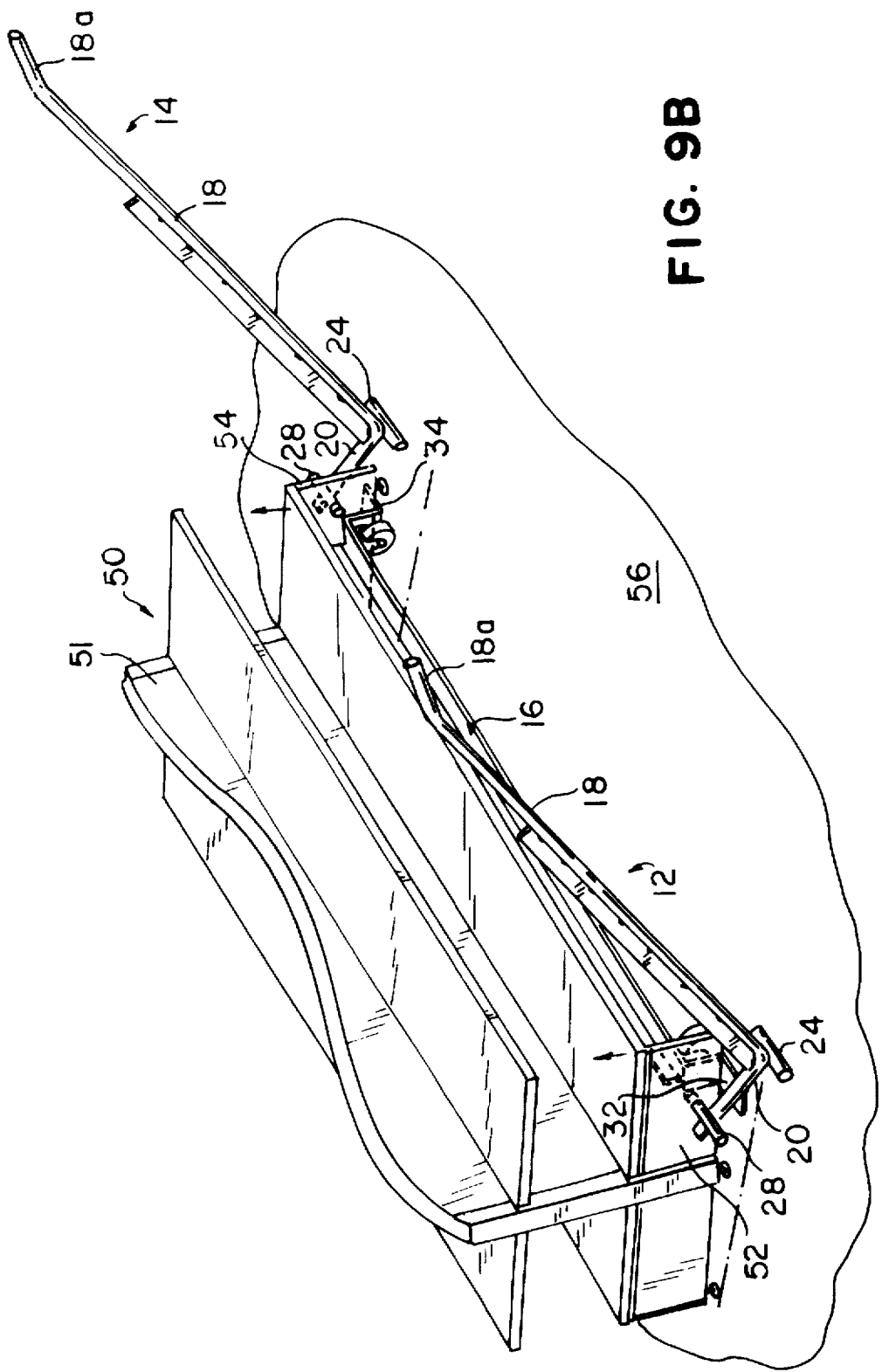

FIGS. 8A–C are side views depicting a method of using the system 10 in FIG. 1 to move a shelf unit, and FIGS. 9A–B are isometric views depicting the method of using the system 10 in FIG. 1. The system 10 is used to move a shelf unit 50 of the type having opposing vertical feet 52 and 54 (see FIGS. 9A–B) for supporting the shelf unit 50 on a ground surface 56. The shelf unit 50 may easily and quickly be moved without first unloading goods stored and displayed on the shelf unit 50.

The first step of the method of using the system 10 utilizes the prying arms 12 and 14 to engage the respective vertical feet 52 and 54. A first individual operates the prying arm 12, while a second individual operates the prying arm 14. As described in connection with FIGS. 2 and 3, the manner in which the vertical feet 52 and 54 are engaged depends upon the construction of the vertical feet 52 and 54. If the vertical feet 52 and 54 each contain a hole, then they are engaged by inserting the transverse members of the respective prying arms 12 and 14 into the holes of the respective vertical feet 52 and 54. FIGS. 7A and 8A, for example, depict the transverse member 28 of the prying arm 12 inserted into the hole of the vertical foot 52. If, however, the vertical feet 52 and 54 do not contain holes, then they are engaged by placing the narrow end lips of the respective prying arms 12 and 14 beneath the respective vertical feet 52 and 54. FIG. 7B, for example, depicts the end lip 26 positioned beneath the vertical foot 52.

Referring to FIGS. 8B and 9A, the shelf unit 50 is lifted upward at least partially off the ground surface 56. If, as shown in FIG. 9A, the shelf unit 50 is of the two-sided type having a central partition 51, the shelf unit 50 is actually tilted upward about the levelers 58 on the other side of the shelf unit. To lift the shelf unit 50, the angled handle portions 18a of the pushable members 18 of the respective prying arms 12 and 14 are pushed downward, which, in turn, causes the lifting members 20 of the respective prying arms 12 and 14 to rotate upward about the pivot elements 24 of the respective prying arms 12 and 14. The pivot elements 24 maintain contact with the ground surface 56 during this upward rotation of the lifting members 20. Since the lifting members 20 of the prying arms 12 and 14 are engaged with the respective vertical feet 52 and 54, the lifting members 20 lift the respective vertical feet upward with them.

At the location where the roller device 16 is to be placed beneath the shelf unit 50, the vertical feet 52 and 54 are lifted upward to a height $H_2$ (see FIG. 8B) slightly greater than the vertical distance $D_1$ (see FIG. 5) of the horizontal portions 32a and 34a of the respective end supports 32 and 34 above the ground surface 56. Therefore, if these horizontal portions 32a and 34a are approximately one inch above the ground surface 56, then the vertical feet 52 and 54 are lifted upward to a height of slightly greater than one inch above the ground surface 56.

Referring to FIGS. 8C and 9B, with the shelf unit 50 lifted at least partially off the ground surface 56, the rolling device 16 is rolled beneath the shelf unit 50 to position the end supports 32 and 34 beneath the respective vertical feet 52 and 54. The rolling device 16 is operated by a third individual, while the prying arms 12 and 14 continue to be operated by the first and second individuals. If the shelf unit 50 has a removable kick plate barring access to the area beneath the shelf unit 50, this kick plate is easily removed prior rolling the rolling device 16 beneath the shelf unit 50.

The vertical feet 52 and 54 are lowered onto the respective end supports 32 and 34 of the rolling device 16 by slowly releasing the downward force applied to the handle portions 18a of the respective prying arms 12 and 14. The rolling device 16 only supports the vertical feet 52 and 54 and is substantially free of contact with portions of the shelf unit 50 other than the vertical feet 52 and 54. For example, the cross bar 36 does not contact the underside of the lower horizontal shelf 58 extending between the vertical feet 52 and 54. In order for the end supports 32 and 34 to properly support the respective vertical feet 52 and 54, the rolling device 16 is sized such that (1) the overall length of the rolling device is greater than the horizontal distance between the vertical feet 52 and 54, and (2) the length of the cross bar 36 is less than the horizontal distance between the vertical feet 52 and 54. This ensures that the vertical feet 52 and 54 rest on the respective end supports 32 and 34.

Figure 10:
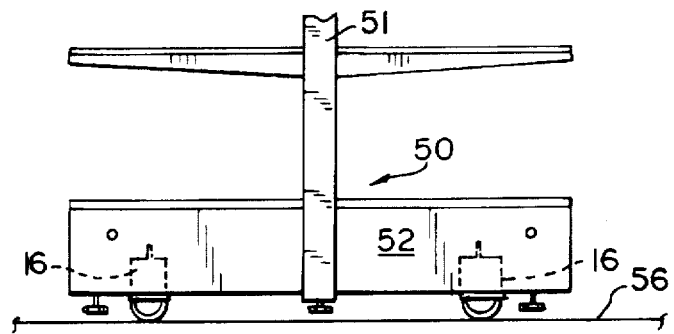
FIG. 10 is a side view showing the use of two rolling devices supporting a two-sided shelf unit.

Once the vertical feet 52 and 54 are resting on the respective end supports 32 and 34, the prying arms 12 and 14 are placed to the side. Referring to FIG. 10, if the shelf unit 50 is of the two-sided type having the central partition 51, the prying arms 12 and 14 are used again in the manner described above to place the end supports of another rolling device 16 beneath the other two vertical feet of the shelf unit 50. The supported shelf unit 50 is moved to a desired location by rolling the rolling devices 16 on their casters. Since the casters of the rolling devices 16 are mounted for swivel movement, the shelf unit 50 can easily be maneuvered around turns.

After the shelf unit 50 reaches the desired location, the prying arms 12 and 14 are used to lift the vertical feet of the shelf unit 50 off the end supports of each rolling device; the rolling devices are rolled away from the shelf unit 50; and the prying arms 12 and 14 are used to lower the vertical feet to the ground surface 56.

Figure 11:
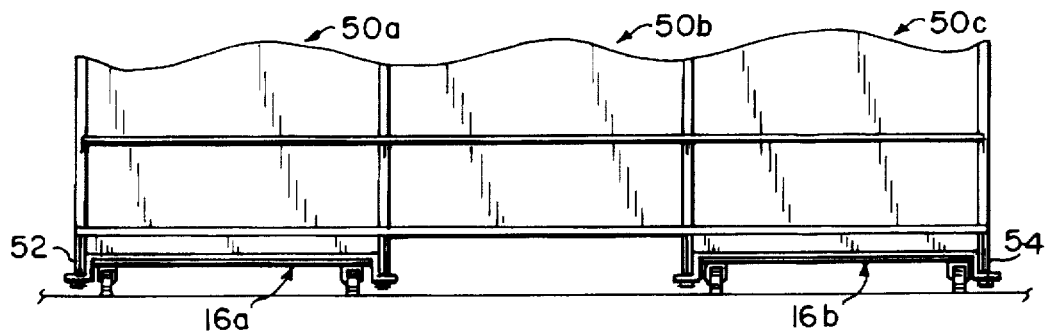
FIG. 11 is a front view showing the use of two rolling devices supporting a series of adjacent shelf units.

While the present invention has been described with reference to one or more particular embodiments, those skilled in the art will recognize that many changes may be made thereto without departing from the spirit and scope of the present invention. For example, as shown in FIG. 11, a pair of rolling devices 16a and 16b can be used to move a series of adjacent shelf units 50a–c. To properly support the vertical feet of the shelf units 50a–c, a rolling device is placed beneath every other shelf unit. Specifically, the rolling device 16a is placed beneath the shelf unit 50a, and the rolling device 16b is placed beneath the shelf unit 50c. The rolling devices 16a and 16b provide support for the respective end shelf units 50a and 50c, as well as the middle shelf unit 50b. It should be understood that if the shelf units 50a–c are of the two-side type (see FIG. 10), then an additional pair of rolling devices are placed beneath the shelf units 50a and 50c on the opposite side of the central partition. Each of these embodiments and obvious variations thereof is contemplated as falling within the spirit and scope of the claimed invention, which is set forth in the following claims.

What is claimed is:

1. A system for moving a shelf unit, said shelf unit including first and second opposing vertical feet for supporting said shelf unit on a ground surface, said system comprising:

first and second prying arms each including a pushable member and a lifting member joined to each other, said first prying arm adapted to lift said first of said vertical feet at least partially off said ground surface in response to engaging said first of said vertical feet with the lifting member of said first prying arm and pushing downward on the pushable member of said first prying arm, said second prying arm adapted to lift said second of said vertical feet at least partially off said ground surface in response to engaging said second of said vertical feet with the lifting member of said second prying arm and pushing downward on the pushable member of said second prying arm, said first and second prying arms not being mechanically connected to each other; and a rolling device including first and second opposing end supports and an intermediate cross bar extending between said first and second end supports, said rolling device including a pair of casters mounted to an underside of said cross bar for allowing said rolling device to be rolled along said ground surface, said first and second end supports being located closer than said cross bar to said ground surface when said rolling device is positioned with its casters contacting said ground surface, said first and second end supports adapted to support said respective first and second vertical feet in response to said vertical feet being lifted at least partially off said ground surface with said first and second prying arms, said rolling device being rolled beneath said shelf unit to position said first and second end supports beneath said respective first and second vertical feet, and said first and second vertical feet being lowered onto said respective first and second end supports.

2. The system of claim 1, wherein said pushable member and said lifting member are integrally formed with each other.

3. The system of claim 1, wherein said first and second prying arms each include a pivot element located at a junction of said pushable member and said lifting member, said pivot element of each of said first and second prying arms contacting said ground surface while said first and second prying arms lift said respective first and second vertical feet at least partially off said ground surface.

4. The system of claim 1, wherein said pushable member and said lifting member define an inclusive angle ranging between about 120 degrees and 140 degrees.

5. The system of claim 1, wherein said cross bar includes a reinforcing brace extending between said first and second end supports.

6. The system of claim 1, wherein said pair of casters are mounted for swivel movement.

7. The system of claim 1, wherein said rolling device is constructed and arranged to support at least 500 pounds.

8. The system of claim 1, wherein said first and second prying arms, said cross bar, and said first and second end supports are composed of steel.

9. The system of claim 1, said first and second end supports include respective generally horizontal portions located no greater than about two inches from said ground surface when said rolling device is positioned with its casters contacting said ground surface.

10. The system of claim 1, wherein said pair of casters are horizontally adjacent to said respective first and second end supports.

11. The system of claim 1, wherein said first and second end supports each are generally L-shaped and include respective generally horizontal portions for supporting said respective first and second vertical feet.

12. The system of claim 1, wherein said cross bar and said first and second end supports are integrally formed with each other.

13. A system for moving a shelf unit, said shelf unit including first and second opposing vertical feet for supporting said shelf unit on a ground surface, said system comprising:

first and second prying arms each including a pushable member and a lifting member joined to each other, said first prying arm lifting said first vertical foot at least partially off said ground surface in response to engaging first vertical foot with the lifting member of said first prying arm and pushing downward on the pushable member of said first prying arm, said second prying arm lifting said second vertical foot at least partially off said ground surface in response to engaging said second vertical foot with the lifting member of said second prying arm and pushing downward on the pushable member of said second prying arm; and a rolling device including first and second opposing end supports and an intermediate cross bar extending between said first and second end supports, said rolling device including a pair of casters mounted to an underside of said cross bar for allowing said rolling device to be rolled along said ground surface, said first and second end supports being located closer than said cross bar to said ground surface when said rolling device is positioned with its casters contacting said ground surface, said first and second end supports supporting said respective first and second vertical feet in response to said vertical feet being lifted at least partially off said ground surface with said first and second prying arms, said rolling device being rolled beneath said shelf unit to position said first and second end supports beneath said respective first and second vertical feet, and said first and second vertical feet being lowered onto said respective first and second end supports;

wherein said lifting member includes alternative means for engaging said respective vertical foot, said alternative means including an end lip and a transverse member proximate to said end lip, said end lip being substantially smaller in thickness than a remainder of said lifting member, said end lip adapted to engage said respective vertical foot by being placed beneath said respective vertical foot, said transverse member adapted to engage said respective vertical foot by being inserted into a hole formed in said respective vertical foot.

14. A method for moving a shelf unit, said shelf unit including first and second opposing vertical feet for supporting said shelf unit on a ground surface, said method comprising the steps of:

providing first and second prying arms each including a pushable member and a lifting member, said first and second prying arms not being mechanically connected to each other;

providing a rolling device including first and second opposing end supports and an intermediate cross bar extending between said first and second end supports, said rolling device including a pair of casters mounted to an underside of said cross bar for allowing said rolling device to be rolled along said ground surface, said first and second end supports being located closer than said cross bar to said ground surface when said rolling device is positioned with its casters contacting said ground surface;

using said first and second prying arms to lift said respective first and vertical feet at least partially off said ground surface;

rolling said rolling device beneath said shelf unit to position said first and second end supports beneath said respective first and second vertical feet;

using said first and second prying arms to lower said respective first and second vertical feet onto said respective first and second end supports; and rolling said rolling device while said first and second vertical feet of said shelf unit are supported by said respective first and second end supports.

15. The method of claim 14, wherein said step of using said first and second prying arms to lift said respective first and second vertical feet includes engaging said first and second vertical feet with the lifting members of said respective first and second prying arms and pushing downward on the pushable members of said respective first and second prying arms.

16. The method of claim 15, wherein said step of using said first and second prying arms to lower said respective first and second vertical feet includes releasing the pushable members of said respective first and second prying arms.

17. The method of claim 14, wherein said rolling device only supports said first and second vertical feet in said step of rolling said rolling device while said first and second vertical feet are supported by said respective first and second end supports.

18. The method of claim 14, wherein said rolling device is substantially free of contact with portions of said shelf unit other than said first and second vertical feet while said first and second vertical feet are supported by said respective first and second end supports.

19. The method of claim 14, wherein said step of using said first and second prying arms to lift said respective first and second vertical feet at least partially off said ground surface includes lifting said first and second vertical feet no greater than about two inches off said ground surface.

20. The method of claim 14, said first and second end supports include respective generally horizontal portions located no greater than about two inches from said ground surface when said rolling device is positioned with its casters contacting said ground surface.

21. The method of claim 14, wherein said first and second prying arms each include a pivot element located at a junction of said pushable member and said lifting member, said pivot element of each of said first and second prying arms contacting said ground surface during said step of using said first and second prying arms to lift said respective first and second vertical feet at least partially off said ground surface.

22. A method for moving a shelf unit, said shelf unit including first and second opposing vertical feet for supporting said shelf unit on a ground surface, said method comprising the steps of:

providing first and second prying arms each including a pushable member and a lifting member, said lifting member including an end lip and a transverse member proximate to said end lip, said end lip being substantially smaller in thickness than a remainder of said lifting member, said end lip engaging said respective vertical foot by being placed beneath said respective vertical foot, said transverse member engaging said respective vertical foot by being inserted into a hole formed in said respective vertical foot;

providing a rolling device including first and second opposing end supports and an intermediate cross bar extending between said first and second end supports, said rolling device including a pair of casters mounted to an underside of said cross bar for allowing said rolling device to be rolled along said ground surface, said first and second end supports being located closer than said cross bar to said ground surface when said rolling device is positioned with its casters contacting said ground surface;

using said first and second prying arms to lift said respective first and vertical feet at least partially off said ground surface by engaging said first and second vertical feet with the lifting members of said respective first and second prying arms and pushing downward on the pushable members of said respective first and second prying arms;

rolling said rolling device beneath said shelf unit to position said first and second end supports beneath said respective first and second vertical feet;

using said first and second prying arms to lower said respective first and second vertical feet onto said respective first and second end supports; and rolling said rolling device while said first and second vertical feet of said shelf unit are supported by said respective first and second end supports.

23. A system for moving a shelf unit, said shelf unit including first and second opposing vertical feet for supporting said shelf unit on a ground surface, said system comprising:

a rolling device including first and second opposing end supports and an intermediate cross bar extending between said first and second end supports, said rolling device including a pair of casters mounted to an underside of said cross bar for allowing said rolling device to be rolled along said ground surface, said first and second end supports being located closer than said cross bar to said ground surface when said rolling device is positioned with its casters contacting said ground surface; and means for engaging and lifting said first and second vertical feet at least partially off said ground surface so that said rolling device can be rolled beneath said shelf unit to position said first and second end supports beneath said respective first and second vertical feet and so that said first and second vertical feet can subsequently be lowered onto said respective first and second end supports, said engaging and lifting means not being mechanically connected to said rolling device and including first and second prying arms not mechanically connected to each other.

24. A combination of a shelf unit and a shelf moving system comprising:

a shelf unit including first and second opposing vertical feet for supporting said shelf unit on a ground surface;

a rolling device including first and second opposing end supports and an intermediate cross bar extending between said first and second end supports, said rolling device including a pair of casters mounted to an underside of said cross bar for allowing said rolling device to be rolled along said ground surface, said first and second end supports being located closer than said cross bar to said ground surface when said rolling device is positioned with its casters contacting said ground surface; and first and second prying arms for engaging and lifting said first and second vertical feet at least partially off said ground surface so that said rolling device can be rolled beneath said shelf unit to position said first and second end supports beneath said respective first and second vertical feet and so that said first and second vertical feet can subsequently be lowered onto said respective first and second end supports, said first and second prying arms not being mechanically connected to each other and not being mechanically connected to said rolling device.

* * * * *